(12) United States Patent
Yamaguchi et al.

(10) Patent No.: US 10,091,477 B2
(45) Date of Patent: Oct. 2, 2018

(54) PROJECTION IMAGE DISPLAY APPARATUS

(71) Applicant: Panasonic Intellectual Property Management Co., Ltd., Osaka (JP)

(72) Inventors: Akiyoshi Yamaguchi, Osaka (JP); Masutaka Inoue, Osaka (JP); Takaaki Gyoten, Hyogo (JP); Takaaki Abe, Osaka (JP); Ryoji Okubo, Osaka (JP); Kazuma Tani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/183,328

(22) Filed: Jun. 15, 2016

(65) Prior Publication Data

US 2017/0019648 A1    Jan. 19, 2017

(30) Foreign Application Priority Data

Jul. 16, 2015  (JP) ................................. 2015-142200
Jun. 9, 2016   (JP) ................................. 2016-114943

(51) Int. Cl.
*H04N 7/01*      (2006.01)
*H04N 11/20*     (2006.01)
(Continued)

(52) U.S. Cl.
CPC ........... *H04N 9/3188* (2013.01); *G09G 3/002* (2013.01); *G09G 3/007* (2013.01); *H04N 7/0132* (2013.01);
(Continued)

(58) Field of Classification Search
CPC . H04N 5/74; H04N 7/01; H04N 11/20; H04N 9/3188; H04N 5/144; H04N 9/3105;
(Continued)

(56) References Cited

U.S. PATENT DOCUMENTS

| 7,970,170 | B2 * | 6/2011 | Tener | G06T 3/4038 |
| | | | | 382/103 |
| 8,315,435 | B2 * | 11/2012 | Chen | G06T 5/50 |
| | | | | 382/107 |
| 2008/0284763 | A1 * | 11/2008 | Someya | G09G 3/001 |
| | | | | 345/204 |

FOREIGN PATENT DOCUMENTS

JP           2009-071444         4/2009

* cited by examiner

*Primary Examiner* — Trang U Tran
(74) *Attorney, Agent, or Firm* — McDermott Will & Emery LLP

(57) ABSTRACT

The projection image display apparatus includes a display element that emits image light generated by modulating light from a light source based, a pixel-shifter that shifts a pixel of a projected image by changing an optical path of the image light, a resampling circuit, a motion-interpolation image processing circuit, and a pixel-shift controller. The resampling circuit generates a plurality of sub-frame image signals having a resolution of the display element, by resampling an image signal having a resolution of the projected image. The motion-interpolation image processing circuit provides a motion-interpolation image process to the sub-frame image signals. The pixel-shift controller receives the sub-frame image signals having undergone the motion-interpolation image process. The pixel-shift controller drives the display element and the pixel shifter at a given timing based on the sub-frame image having undergone the motion-interpolation image process, and then displays the projected image, which involves pixel-shift, on a screen.

4 Claims, 16 Drawing Sheets

(51) Int. Cl.
  *H04N 9/31*   (2006.01)
  *G09G 3/00*   (2006.01)
  *H04N 5/14*   (2006.01)
(52) U.S. Cl.
  CPC ........... *H04N 9/312* (2013.01); *H04N 9/3105* (2013.01); *H04N 9/3155* (2013.01); *G09G 2340/0457* (2013.01); *H04N 5/144* (2013.01)
(58) Field of Classification Search
  CPC ...... H04N 9/312; H04N 9/3155; G09G 3/002; G09G 3/007; G09G 3/36; G09G 3/24; G09G 3/20; G09G 2340/0457
  USPC ................................ 348/441, 443, 451, 452
  See application file for complete search history.

FIG. 9

| | 0 | 1 | 2 | 3 |
|---|---|---|---|---|
| 5 | 220 | 320 | 221 | 321 |
| 4 | 120 | 420 | 121 | 421 |
| 3 | 210 | 310 | 211 | 311 |
| 2 | 110 | 410 | 111 | 411 |
| 1 | 200 | 300 | 201 | 301 |
| 0 | 100 | 400 | 101 | 401 |

Column numbers (3840 pixels)
Row numbers (2160 pixels)

PROJECTION IMAGE DISPLAY APPARATUS

BACKGROUND

Technical Field

The present disclosure relates to a projection image display apparatus that projects an image.

Description of the Related Art

Patent literature 1 discloses an image projector, which includes a motion-interpolation image processing circuit, a control circuit for pixel shift, and a pixel-shifting element. The motion-interpolation image processing circuit generates, based on motion picture data that is formed of multiple frame images, at least one interpolation frame image having a time corresponding to a time between two consecutive frame images. This structure allows the image projector to display a motion picture more fluid with a higher resolution.

RELATED ART LITERATURE

Patent Literature

Unexamined Japanese Patent Application Publication No. 2009-71444

SUMMARY

Presence of a motion-interpolation image processing circuit for each sub-frame to be projected allows decreasing load of each one of the motion-interpolation image processing circuits. The present disclosure thus aims to provide a projection image display apparatus that can form the motion-interpolation image processing circuits with ease.

The projection image display apparatus of the present disclosure includes a display element that emits image light generated by modulating light from a light source based on a video signal, and a pixel-shifter that shifts a pixel of a projected image by changing an optical path of the image light emitted from the display element. The projection image display apparatus is formed of the following structural elements:

a resampling circuit for generating a plurality of sub-frame image signals having a resolution equal to a resolution of the display element, by resampling an image signal having a resolution equal to a resolution of the projected image;

a motion-interpolation image processing circuit for providing a motion-interpolation image process to the sub-frame image signals output from the resampling circuit; and a pixel-shift controller for receiving the sub-frame image signals having undergone the motion-interpolation image process and supplied from the motion-interpolation image processing circuit.

the pixel-shift controller drives the display element and the pixel shifter at a given timing based on the sub-frame image having undergone the motion-interpolation image process, and then displays the projected image, which involves pixel-shift and is emitted from the display element, on a screen.

The projection image display apparatus of the present disclosure is provided with the motion-interpolation image processing circuit for each sub-frame to be projected, whereby the load of each of the motion-interpolation image processing circuit can be reduced. As a result, the projection image display apparatus can easily form the motion-interpolation image processing circuit.

BRIEF DESCRIPTION OF THE DRAWINGS

FIG. 9 schematically illustrates a base image signal to be a base of a projected image.

DETAILED DESCRIPTION

Exemplary embodiments of the present disclosure are detailed hereinafter with reference to the accompanying drawings. Descriptions more than necessary are sometimes omitted. For instance, detailed descriptions of well-known matters or duplicated descriptions of substantially the same structures are omitted in order to avoid redundant descriptions, and aid ordinary skilled person in the art to understand the disclosure.

The applicant provides the accompanying drawings and the descriptions below for the ordinary skilled person in the art to fully understand the present disclosure, and these materials will not limit the scope of patent claims.

First Exemplary Embodiment

The first embodiment is demonstrated hereinafter with reference to FIG. 1-FIG. 15.

1-1. Structure

1-1-1. Optical Structure of the Projector

Figure 1:
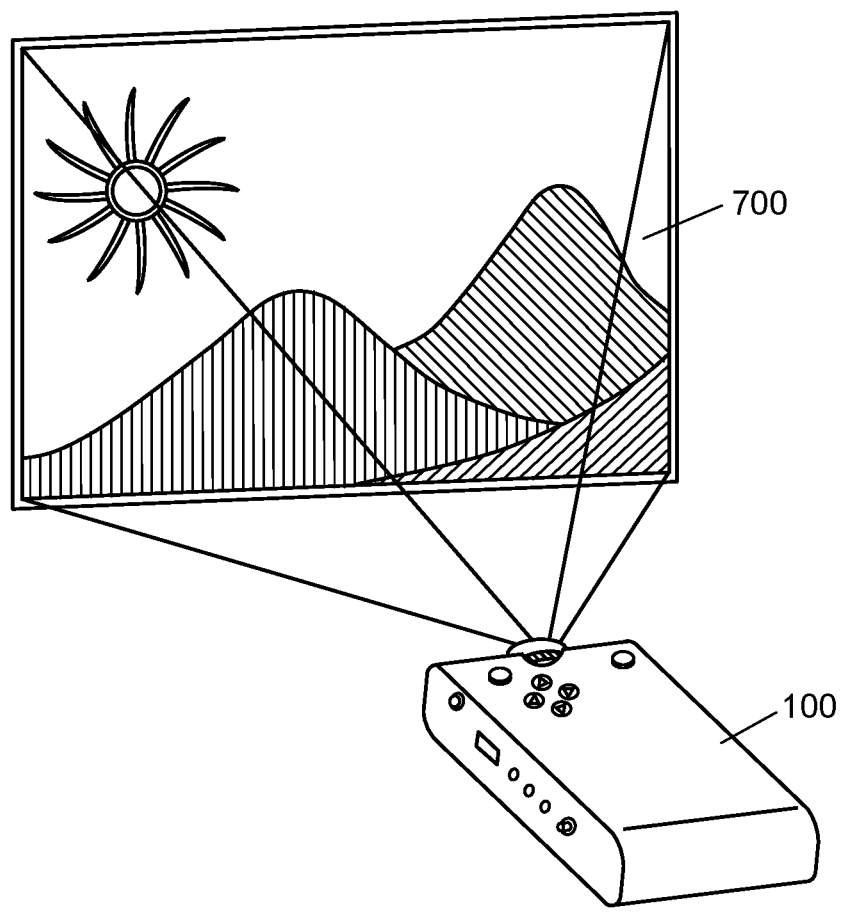
FIG. 1 shows a usage state of a projection image display apparatus of the present disclosure.
Figure 2:
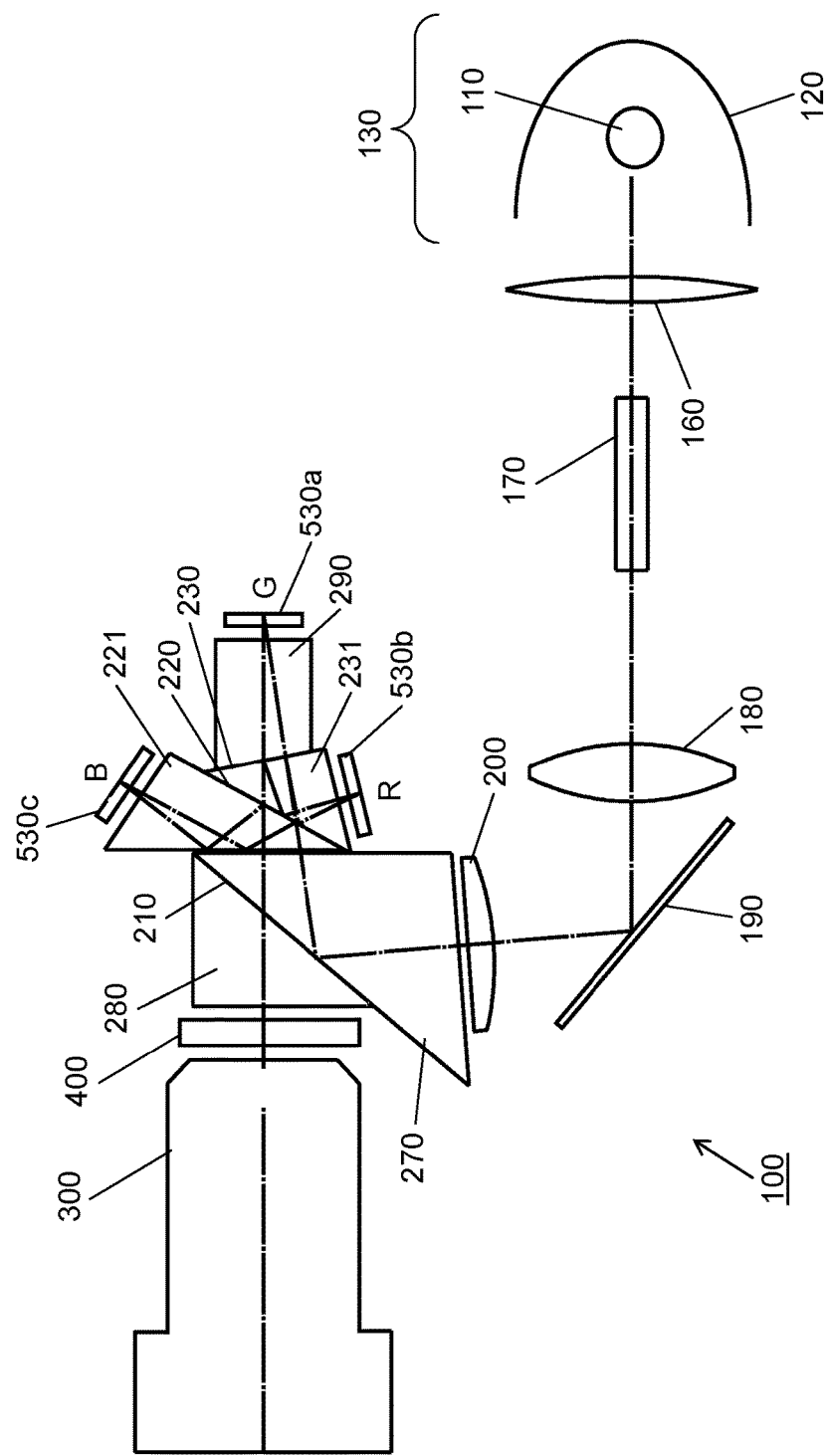
FIG. 2 shows an example of an optical structure of the projection image display apparatus.

FIG. 1 shows a state where projector 100 in accordance with the present disclosure projects an image onto screen 700. The optical structure of this projector 100 is described hereinafter with reference to a schematic diagram of FIG. 2.

Projector 100 includes light source 130 formed of luminous tube 110 and reflector 120 that reflects white light emitted from luminous tube 110. Luminous tube 110 emits the white light beam containing red light, green light, and blue light, each having different wave ranges. Luminous tube 110 is formed of, for instance, an extra-high pressure mercury lamp or a metal halide lamp. Reflector 120 reflects the light beam emitted from luminous tube 110 disposed at a focal point, thereby emitting substantially parallel light forward.

The white light from light source 130 enters an illumination optical system which is formed of lens 160, rod 170, lens 180, and mirror 190. The illumination optical system guides the light beam emitted from light source 130 to three DMDs (digital mirror device) 530a, 530b, and 530c. These three DMDs 530a, 530b, and 530c are named generically as DMD 530. Rod 170 is a pillar-shaped glass member that reflects light totally inside. The light beam emitted from light source 130 reflects multiple times inside rod 170, whereby a light intensity distribution at an outgoing face of rod 170 becomes substantially uniform. Lens 180 is a relay-lens that forms an image on DMDs 530a, 530b, and 530c by using the light beam on the outgoing face of rod 170. Mirror 190 reflects the light beam traveling through lens 180. The reflected light beam then enters field lens 200, which converts this incident light into substantially parallel light beam. The light beam traveling through field lens 200 then enters a total reflection prism.

The total reflection prism is formed of prism 270 and prism 280. Air space 210 is present on a vicinal face between prism 270 and prism 280. Air space 210 totally reflects the light beam entering at a critical angel or greater, and this totally reflected light beam enters a color prism.

The color prism is formed of prism 221, prism 231, and prism 290. Dichroic film 220 is provided on a vicinal face between prism 221 and prism 231 for reflecting blue light. Dichroic film 230 is provided on a vicinal face between prism 231 and prism 290 for reflecting red light. Prism 290, prism 231, and prism 221 are provided with DMD 530a, DMD 530b, and DMD 530c respectively.

Each of DMD 530a, DMD 530b, and DMD 530c includes 1920×1080 pcs. of micro-mirrors. DMD 530 deflects each of the micro-mirrors in response to a video signal. DMD 530 thus divides the light beam into the light entering projection optical system 300 and the light to be reflected outside the effective range of projection optical system 300 in response to the video signal, thereby modulating the light entering DMD 530. Green light enters DMD 530a, red light enters DMD 530b, and blue light enters DMD 530c.

The light beam, among the light beams reflected by DMDs 530a, 530b, and 530c, entering projection optical system 300 is synthesized by the color prism. The synthesized light beam enters the total reflection prism, and then enters air space 210 at the critical angle or smaller. This light beam thus penetrates through air space 210 and enters projection optical system 300.

Projection optical system 300 magnifies the incident light beam, and includes functions of focusing and zooming. It projects image light supplied from DMD 530 onto a screen, thereby displaying the image on the screen.

Projector 100 is disposed within a plane vertical to the optical axis of projection optical system 300, and includes parallel-flat glass 400 as an optical element that can perform the action described later. The action of this parallel-flat glass 400 allows projector 100 to shift display positions on the screen of the pixels that form the image generated by DMD 530 by intervals equal to or smaller than the pixel pitch. This mechanism allows projector 100 to project images at a higher resolution.

1-1-2. Structure Between the Prisms and a Projection Lens

Pixel shifter 430 is detailed hereinafter. Pixel shifter 430 drives parallel-flat glass 400 disposed between projection optical system 300 and the prism block formed of the total reflection prism and the color prism.

Figure 3:
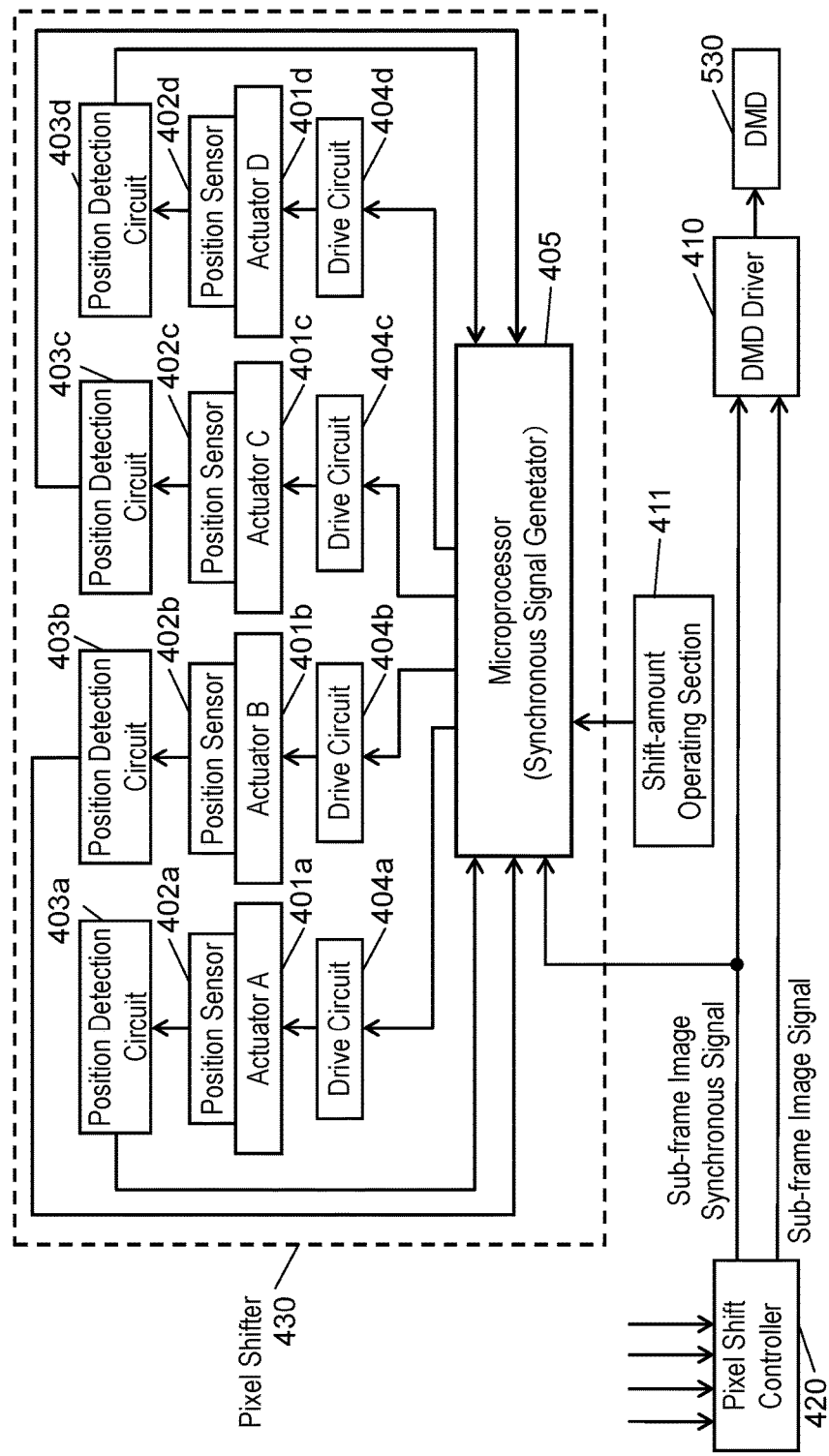
FIG. 3 is a block diagram of a pixel shifter used in an embodiment of the present disclosure.
Figure 4:
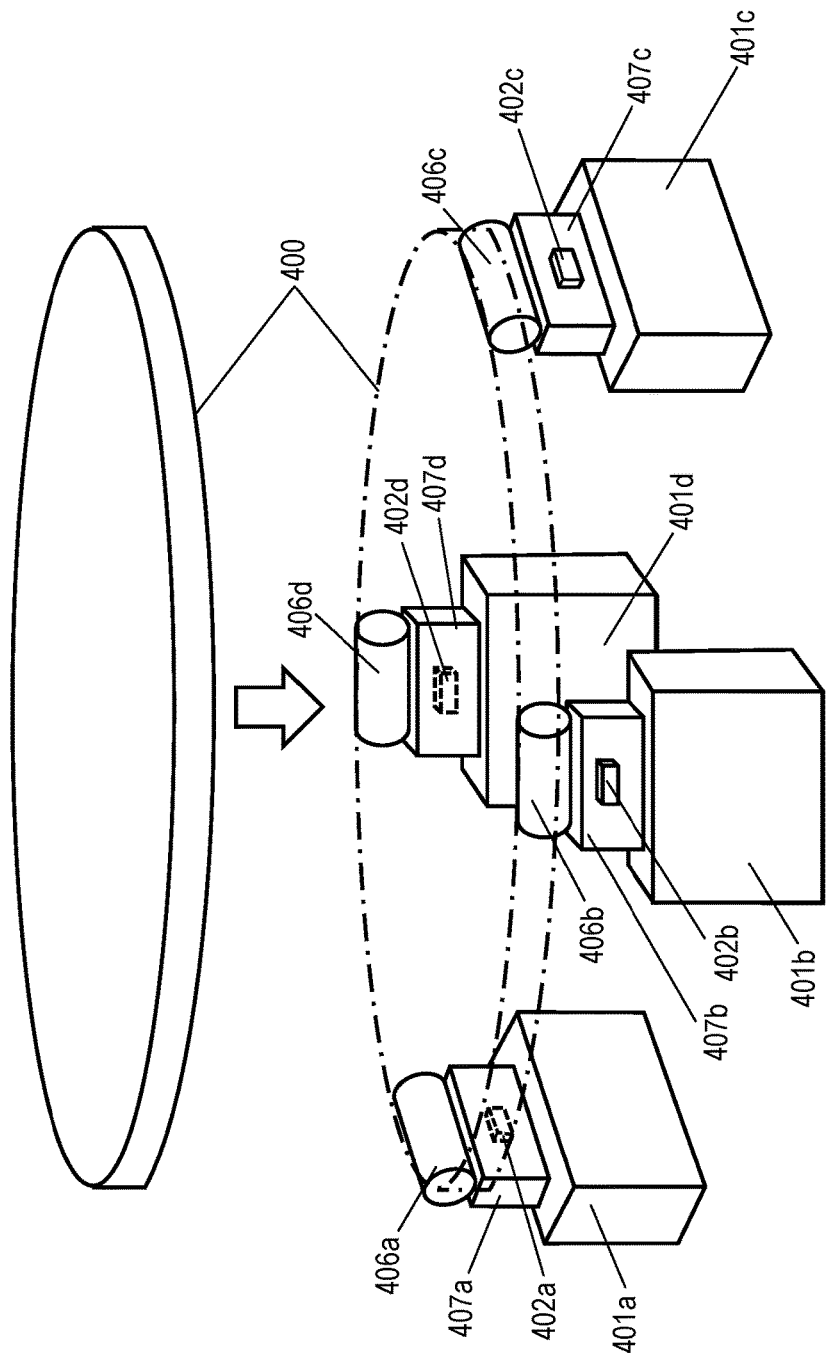
FIG. 4 is a schematic diagram of the pixel shifter used in an embodiment of the present disclosure.

FIG. 3 is a block diagram illustrating an entire circuit structure of pixel shifter 430 in accordance with the embodiment. FIG. 4 shows a profile of pixel shifter 430 to be driven by the circuit shown in FIG. 3. Pixel shifter 430 shown in FIG. 3 and FIG. 4 except external devices to be connected thereto is disposed in projector 100.

In this embodiment, parallel-flat glass 400 in a disk shape is used as an optical element. The rim of parallel-flat glass 400 is connected to four actuators A401a, B401b, C401c, and D401d at movable sections 407a, 407b, 407c, and 407d via connecting members 406a, 406b, 406c, and 406d.

Figure 5:
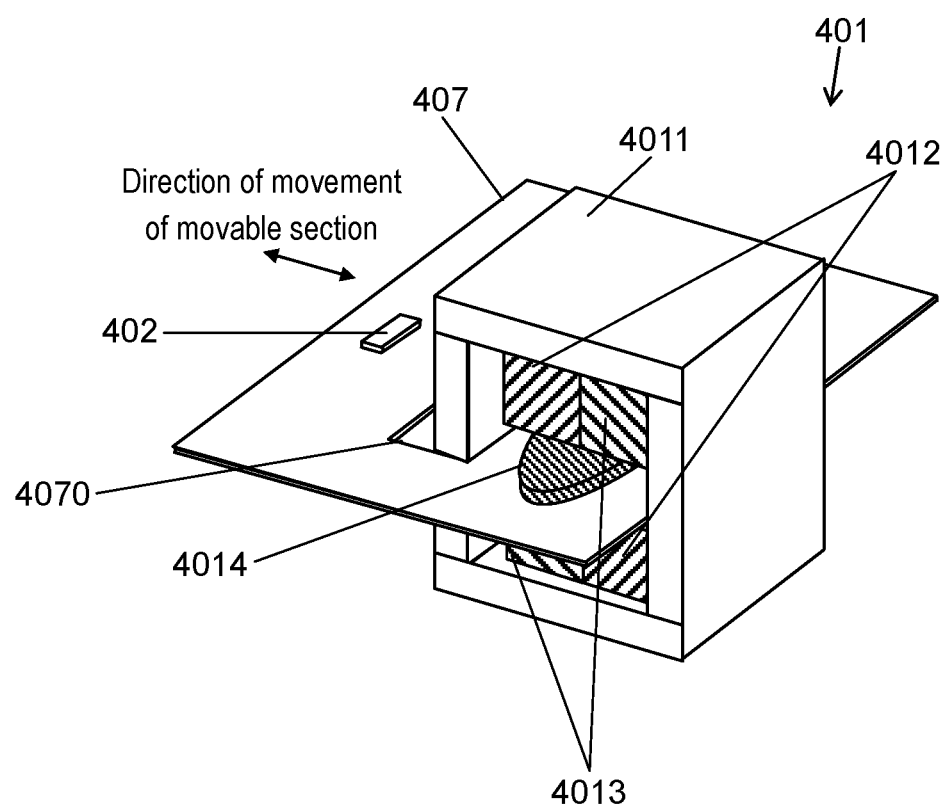
FIG. 5 shows components used in the pixel shifter.

In this embodiment, a voice coil motor (VCM) is used as actuator 401 (actuator A401a-actuator D401d). FIG. 5 shows an instance of a structure of the VCM. Yoke 4011 in a box shape includes permanent magnets 4012 (N-pole) and 4013 (S-pole) confronting each other with a given space therebetween, and movable section 407 (407a to 407d) is disposed between these permanent magnets 4012 and 4013.

Movable section 407 includes guide-window 4070 through which yoke 4011 extends. Coil 4014 provided to movable section 407 is disposed between permanent magnets 4012 and 4013 confronting each other. A drive-signal current flowing through coil 4014 prompts movable section 407 to move along a uniaxial direction marked with an arrow in FIG. 5. A movement amount of movable section 407 depends on the magnitude of the signal current flowing through coil 4014, and movable section moves in a positive direction or a negative direction from a reference position. The movement amount of movable section 407 can be detected with position sensor 402 (402a to 402d) mounted to movable section 407. Position sensor 402 is detected by position detection circuits 403a to 403d shown in FIG. 3. There is a slight gap between movable section 407 to which coil 4014 is mounted and permanent magnets 4012, 4013, so that even if vertical force is applied to the uniaxial direction along which movable section 407 is driven by the drive signal current, movable section 407 can slant because of the slight gap that allows movable section 407 to shift within a distance permitted by the slight gap.

Figure 6:
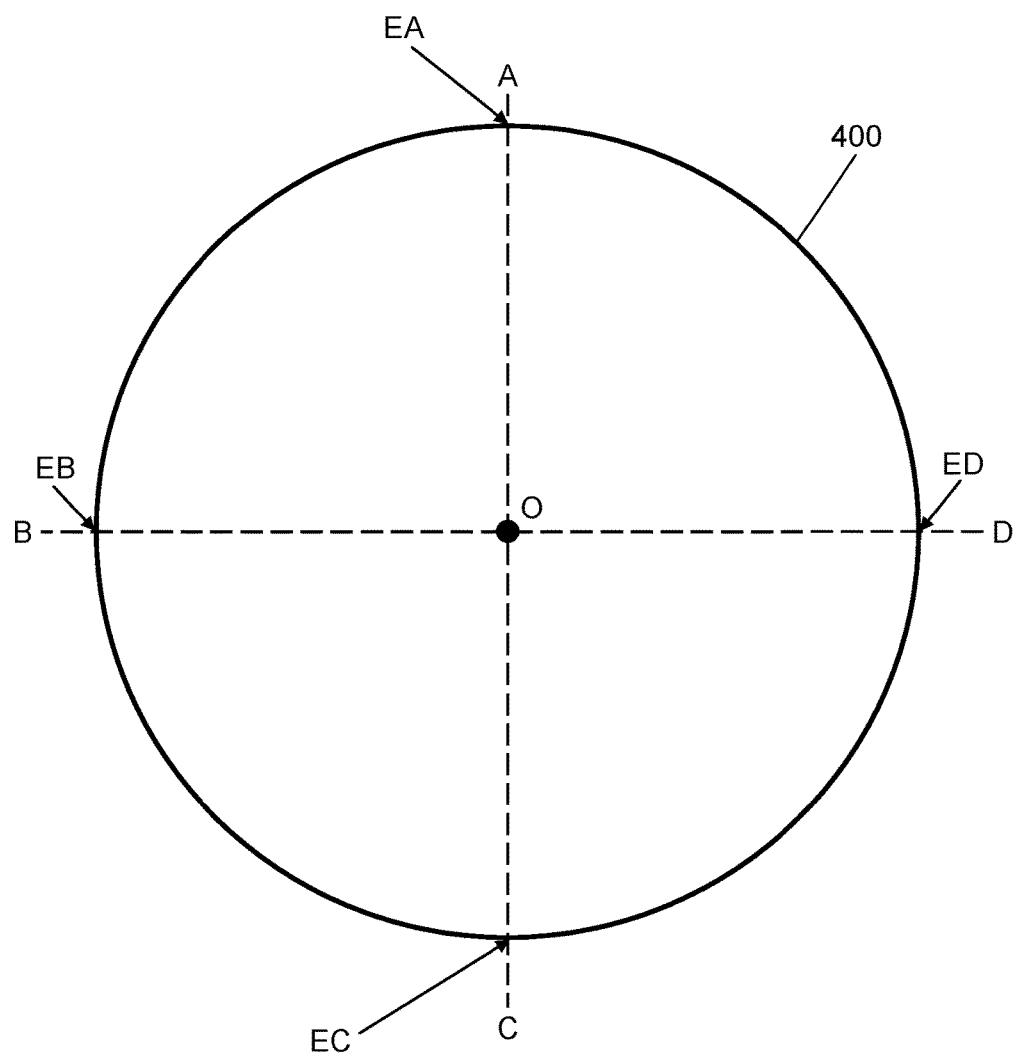
FIG. 6 is a plan view of a parallel-flat glass used in an embodiment of the present disclosure.

Connecting members 406a to 406d that connect movable sections 407a to 407d of actuator 401 together are connected to each other on the rim of parallel-flat glass 400 at ends EA, EB, EC, and ED which are defined as intersections between the rim and straight lines A-C, B-D orthogonal at plane center O of parallel-flat glass 400 as shown in FIG. 6.

As FIG. 3 shows, four actuators A401a, B401b, C401c, and D401d are driven by drive circuits 404a, 404b, 404c, and 404d controlled with a control signal supplied from one microprocessor 405. The drive-signal current supplied from drive circuits 404a to 404d drives actuators A401a to D401d such that movable sections 407a to 407d move back and forth along the uniaxial direction. Detection of position sensors 402a to 402d by position detection circuits 403a to 403d allows detecting the positions of movable sections 407a to 407d, and the detection output supplied from position detection circuits 403a to 403d enters microprocessor 405, which then monitors continuously the positions of movable sections 407a to 407d of actuator A401a to actuator D401d based on the detection output for servo-controlling the actuator A401a to actuator D401d.

Microprocessor 405 receives a synchronous signal of sub-frame image from pixel-shift controller 420, and based on this synchronous signal, microprocessor 405 generates a synchronous signal to be supplied to drive circuits 404a to 404d. DMD driver 410 receives the sub-frame image signal and the synchronous signal of the sub-frame image from pixel-shift controller 420 for generating a DMD drive signal and a synchronous signal to be used for controlling DMD 530. The synchronous signal of the sub-frame image allows the control of the actuator and the control of DMD 530 to be synchronized. Pixel-shift controller 420 will be described later.

The movement amounts of movable sections 407a to 407d of actuator 401 can be adjusted this way: Operation of shift-amount operating section 411 allows inputting a signal indicating an amount of adjustment into microprocessor 405, which then controls drive circuits 404a to 404d. Shift-amount operating section 411 can be, for instance, operation keys provided to the main body of projector 100, or keys provided to a remote controller for operating projector 100.

Figure 7:
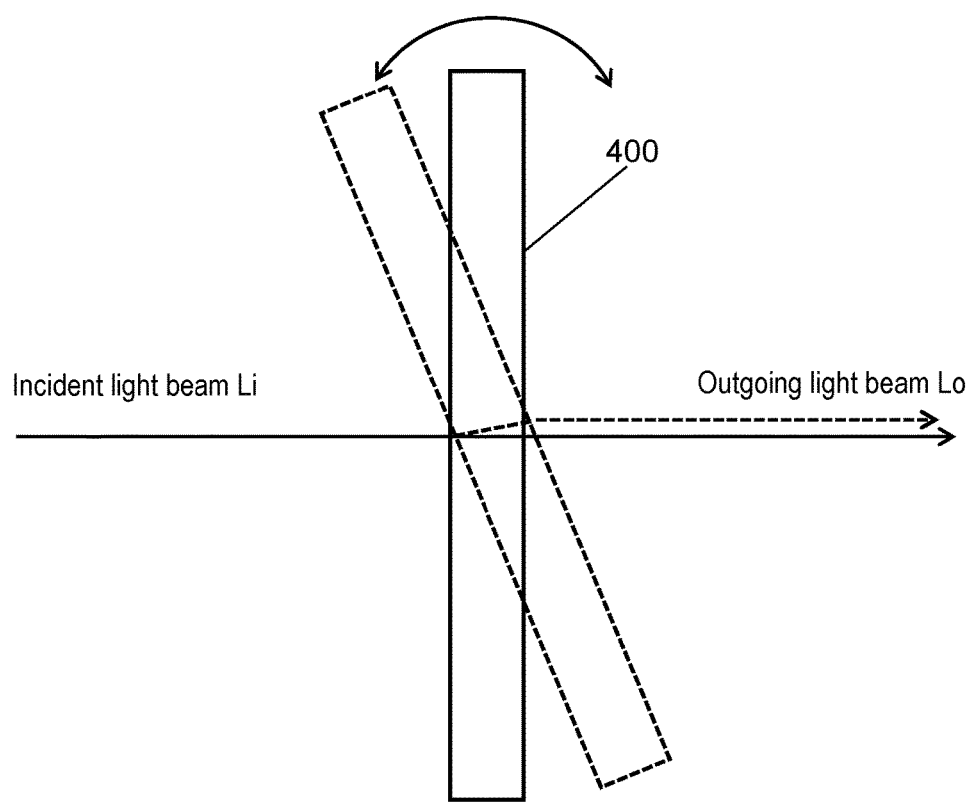
FIG. 7 illustrates a theory of changing a light path with the parallel-flat glass.

The operation of the foregoing pixel shifter 430 is demonstrated hereinafter. As FIG. 7 shows, in the case where parallel-flat glass 400 intersects incident light beam Li at right angles, incident light beam Li does not refract but travels straight forward through the interface between parallel-flat glass 400 and air. The incident light beam thus penetrates through parallel-flat glass 400 without refraction. On the interface just before outgoing to the air, since parallel-flat glass 400 is formed of parallel-flat faces and the light beam intersects this interface at right angles, the light beam does not refract but travels straight forward. This structure proves that in the case of incident light beam Li being image light, an image shift does not occur.

On the other hand, in the case where parallel-flat glass 400 intersects incident light beam Li at angles except right angles as shown in FIG. 7 with broken lines, incident light beam Li refracts on the interface between parallel-flat glass 400 and the air. The refracted incident light beam Li enters parallel-flat glass 400, and travels through parallel-flat glass 400, and outgoes via another interface to the air. At this outgoing interface, the light beam refracts again because parallel-flat glass 400 is formed of parallel-flat faces and the light beam does not orthogonally intersect the interface.

Since a refraction angle at entering parallel-flat glass 400 is equal to a refraction angle at outgoing from parallel-flat glass 400, when incident light beam Li is image light, the image light of outgoing light beam Lo shifts in parallel to the slanting direction of parallel-flat glass 400. As a result, the image output from parallel-flat glass 400 and projected on the screen is shifted from an original display position.

Figure 8:
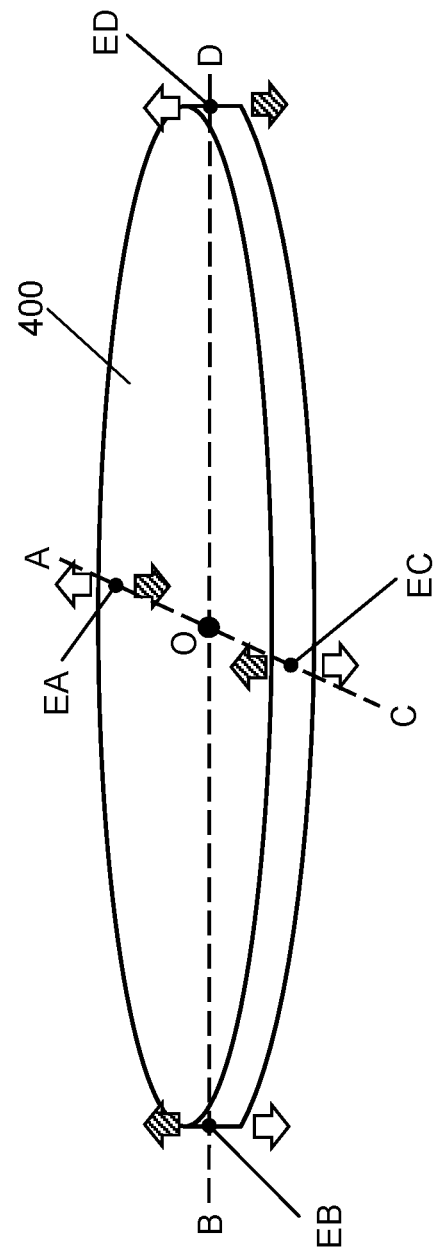
FIG. 8 illustrates movements of the parallel-flat glass used in the embodiment.

To shift a display position of an image by using the foregoing theory, the parallel-flat glass 400 is connected to movable sections 407a to 407d of each of actuators 401 via connecting members 406a to 406d at ends EA, EC, EB, and ED on the rim of parallel-flat glass 400 in rockable manner. These ends EA, EC, EB, and ED are defined as intersections between the rim and A-C axis, B-D axis intersecting orthogonally. Drive of actuator 401 allows end EA, for instance, to move upward in a given amount and allows end EC to move downward in a given amount as shown in FIG. 8 with center O being kept at a given position. In this case, B-D axis works as a rotation axis. At the same time, end EB moves downward in a given amount and end ED moves upward in a given amount around A-C axis working as a rotation axis. This mechanism allows changing the light path of the image light entering parallel-flat glass 400, whereby the pixels can be displayed at given positions. As discussed above, control of ends EA, EB, EC, and ED upward or downward will achieve the pixel shift that causes the shift of display positions of pixels.

1-2. Operation 1-2-1. Output of a Double Density Image

In the case of outputting a double density image, parallel-flat glass 400 is rocked along a uniaxial direction (in FIG. 6, the direction of either one of A-C axis or B-D axis working as a rotation axis), thereby shifting pixels. In this case, DMD driver 410 shown in FIG. 3 generates a DMD drive signal so that image signals of two sheets of sub-frames can output at a doubled speed comparing with a speed of an input frame rate. Microprocessor 405 of pixel shifter 430 generates synchronous signals for drive circuits 404a to 404d of the actuator based on image synchronous signals of the supplied two sheets of sub-frames. Each of drive circuits 404a to 404d drives each of actuators A401a to actuator D401d while DMD driver 410 is synchronized with these drive circuits, thereby generating actuator drive signals for shifting the pixels in projection positions.

Specific actions of pixel-shift controller 420 are demonstrated hereinafter with reference to FIG. 9 and FIG. 10. DMDs 530a, 530b, 530c in projector 100 are capable of outputting an image formed of 1920 pixels (horizontal direction)×1080 pixels (vertical direction). The drive of parallel-flat glass 400 by actuator 401 is set such that a shift amount of projection position is ½ pixel in horizontal direction and ½ pixel in vertical direction. The shift by ½ pixel refers to moving a pixel to a position distanced from its original position by a half of a pitch between pixels.

FIG. 9 shows an image signal to be a base for generating a sub-frame signal of projector 100. This image signal is formed of 3840 pixels (horizontal direction)×2160 pixels (vertical direction), namely, a signal of 4K2K image. The number of pixels of this base image signal is quadruple of the pixels of DMDs 530a, 530b, and 530c. The resolution of the base image signal formed of 3840 pixels×2160 pixels is an example of a second resolution.

Figure 10:
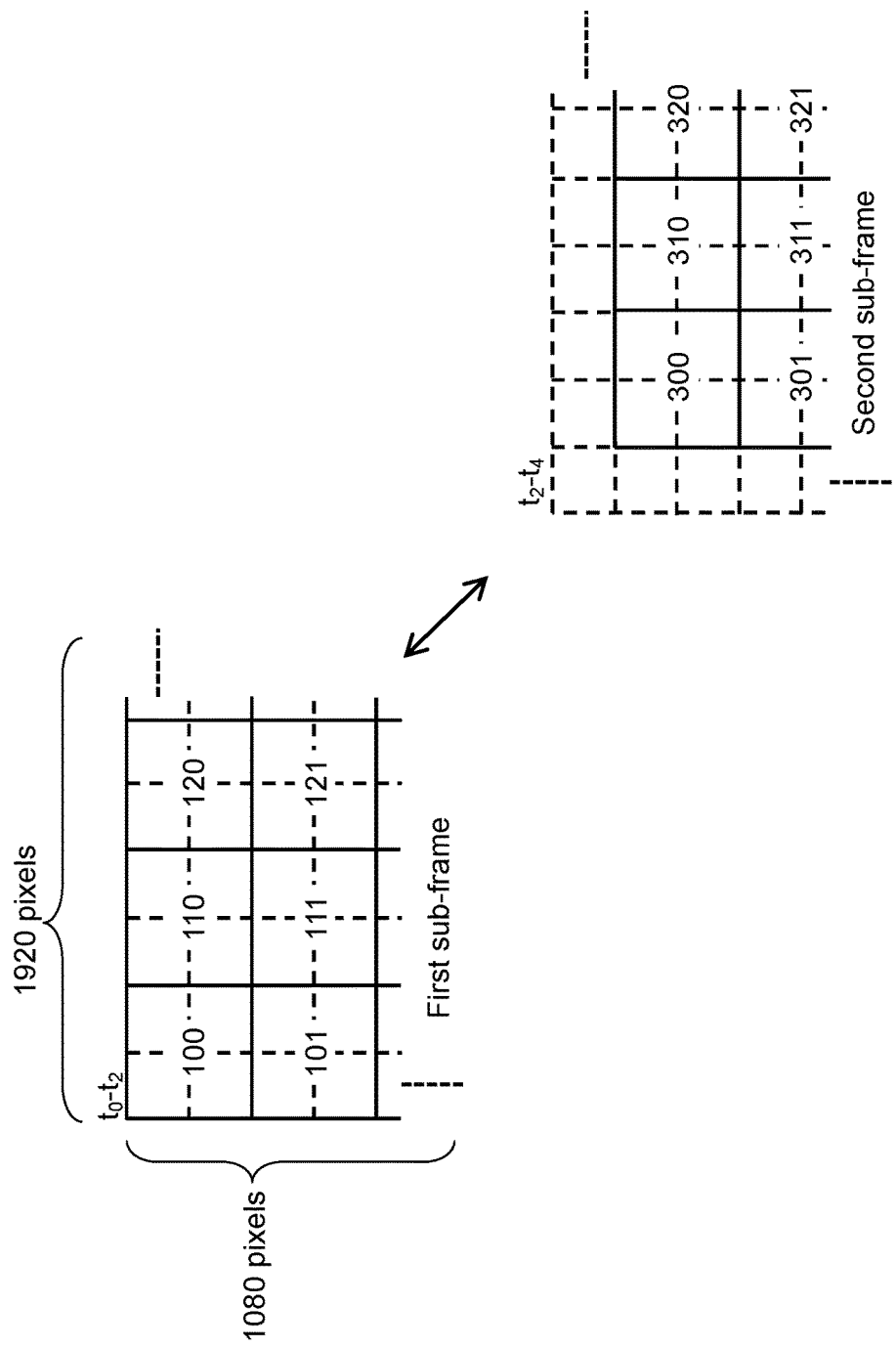
FIG. 10 shows a sub-frame image signal produced from the base image signal for a double-density image.

FIG. 10 shows a method for generating image signals of two sheets of sub-frames (resample image signal) by resampling at two different sampling positions from a base signal of one sheet of frame. These image signals of two sheets of sub-frames are supplied to pixel-shift controller 420. The resolution of these signals corresponds to a third resolution.

The base image signal shown in FIG. 9 are marked with column numbers (0, 1, 2, 3, 4, 5, . . . ) in horizontal direction and row numbers (0, 1, 2, 3, . . . ) in vertical direction.

(1) A first sub-frame signal is determined this way: A pixel is defined by the following two numerical values: a numerical value indicating a column number starting from column 0 (zero) horizontally is divided by 2 with a remainder of 0, and a numerical value indicating a row number starting from row 0 vertically is divided by 2 with a remainder of 0. A signal derived from sampling this pixel is referred to as the first sub-frame signal.

(2) A second sub-frame signal is determined this way: A pixel is defined by the following two numerical values: a numerical value indicating a column number starting from column 0 (zero) horizontally is divided by 2 with a remainder of 1, and a numerical value indicating a row number starting from row 0 vertically is divided by 2 with a remainder of 1. A signal derived from sampling this pixel is referred to as the second sub-frame signal.

DMDs 530*a*, 530*b*, 530*c* output the sub-frame images at a speed twice as high as an output frame rate. To be more specific, assume that the output frame rate is 60 Hz, then the sub-frame image is output at 120 Hz, and the actuator is driven at 60 Hz.

Figure 11:
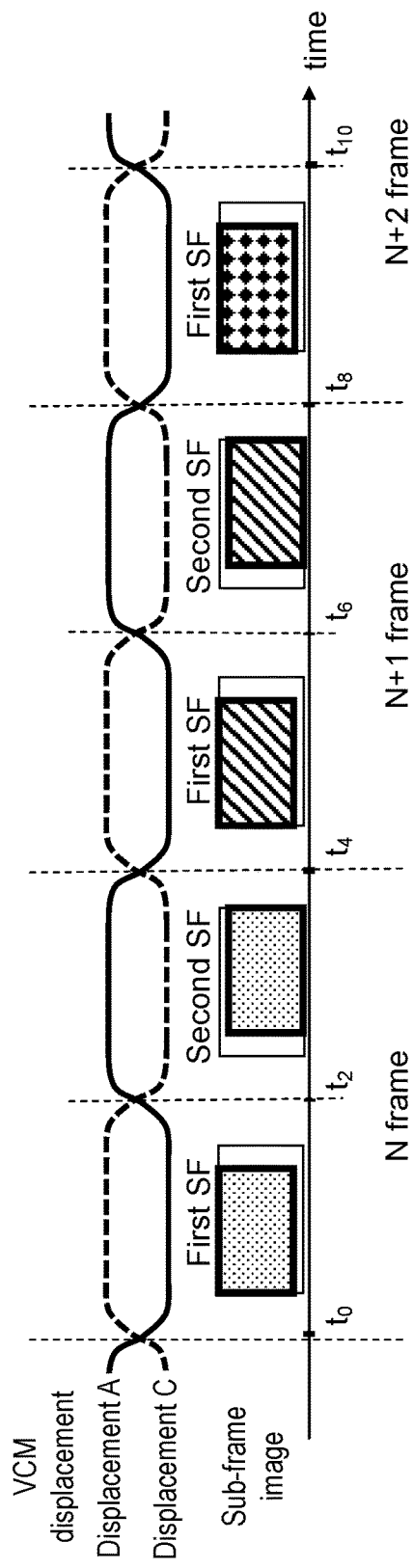
FIG. 11 shows a state where the sub-frame image signal is shifted so as to be a double-density image.

FIG. 11 schematically illustrates a displacement (VCM displacement amount) to be given to the actuator as an instruction, and a moving manner of a sub-frame image. In this case, as FIG. 11 shows, displacement A is given to actuator A401*a* as an instruction, and displacement C inverted from displacement A is given to actuator C401*c* as an instruction. No instruction is given to actuator B401*b* or actuator D401*d*, so that no displacement occurs. This mechanism allows parallel-flat glass 400 rocks on B-D axis working as a rotation axis. The rocking of parallel-flat glass 400 allows changing an optical path of the incident image light, whereby the first sub-frame image (first SF) and the second sub-frame image (second SF) are projected while these two images are shifted from each other by an amount of half pixel.

1-2-2. Output of a Quadruple Density Image

Parallel-flat glass 400 is rocked in two directions (A-C axis and B-D axis shown in FIG. 6 are used as rotation axes) for shifting pixels, thereby achieving the quadruple density image. In this case, DMD driver 410 shown in FIG. 3 generates a DMD drive signal such that image signals of four sheets of sub-frames can be output at a quadruple speed of the input frame rate. Microprocessor 405 of pixel shifter 430 generates synchronous signals of drive circuits 404*a* to 404*d* of the actuator from the image synchronous signals of the image signals of the four sub-frames entering the pixel shifter 430. Each of drive circuits 404*a* to 404*d* drives each of actuators A401*a* to actuator D401*d* while DMD driver 410 is synchronized with these drive circuits, thereby generating actuator drive signals for shifting the projection positions of the pixels.

An image outputting action capable of moving a projection position in two directions is demonstrated hereinafter with reference to FIG. 12 and FIG. 13. The resolution of a DMD 530 working as a display element, and the resolution of the base image signal are the same as what is discussed in the output action of the double density image.

Figure 12:
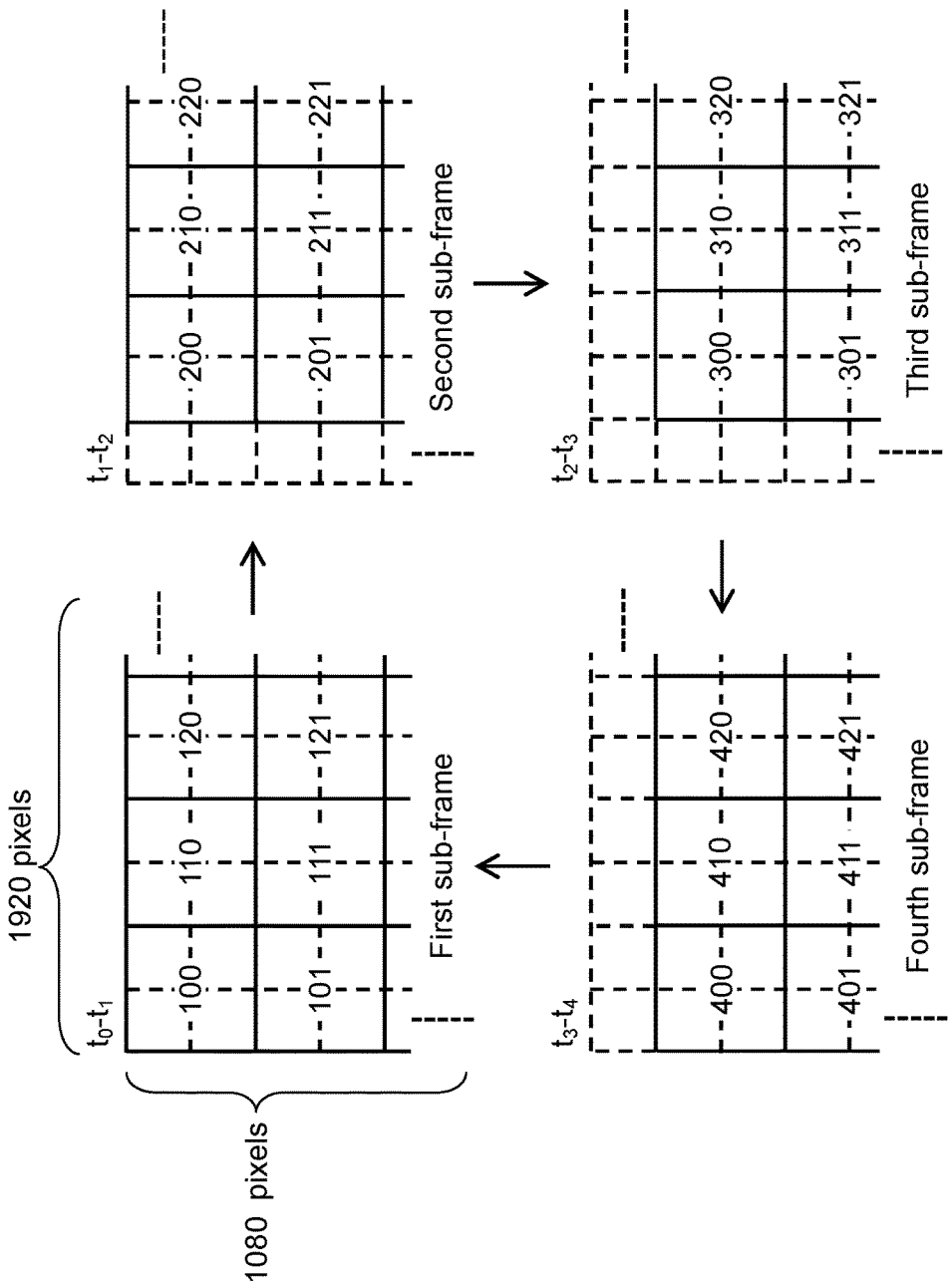
FIG. 12 shows a sub-frame image signal produced from the base image signal for a quadruple-density image.

FIG. 12 shows a method for generating image signals of four sheets of sub-frames (resample image signal) by resampling at different sampling positions from a base signal of one frame shown in FIG. 9. These image signals of the four sub-frames are supplied to pixel-shift controller 420.

Using the base image signal shown in FIG. 9, (1) A first sub-frame is determined this way: a numerical value indicating a number starting from 0 (zero) horizontally is divided by 2 with a remainder of 0, and a numerical value indicating a number starting from 0 vertically is divided by 2 with a remainder of 0.

(2) A second sub-frame is determined this way: a numerical value indicating a number starting from 0 (zero) horizontally is divided by 2 with a remainder of 1, and a numerical value indicating a number starting from 0 vertically is divided by 2 with a remainder of 0.

(3) A third sub-frame is determined this way: a numerical value indicating a number starting from 0 (zero) horizontally is divided by 2 with a remainder of 1, and a numerical value indicating a number starting from 0 vertically is divided by 2 with a remainder of 1.

(4) A fourth sub-frame is determined this way: a numerical value indicating a number starting from 0 (zero) horizontally is divided by 2 with a remainder of 0, and a numerical value indicating a number starting from 0 vertically is divided by 2 with a remainder of 1.

DMDs 530*a*, 530*b*, 530*c* output the sub-frame images at a speed quadruple as high as an output frame rate. To be more specific, assume that the output frame rate is 60 Hz, then the sub-frame image is output at 240 Hz, and the actuator is driven at 60 Hz.

Figure 13:
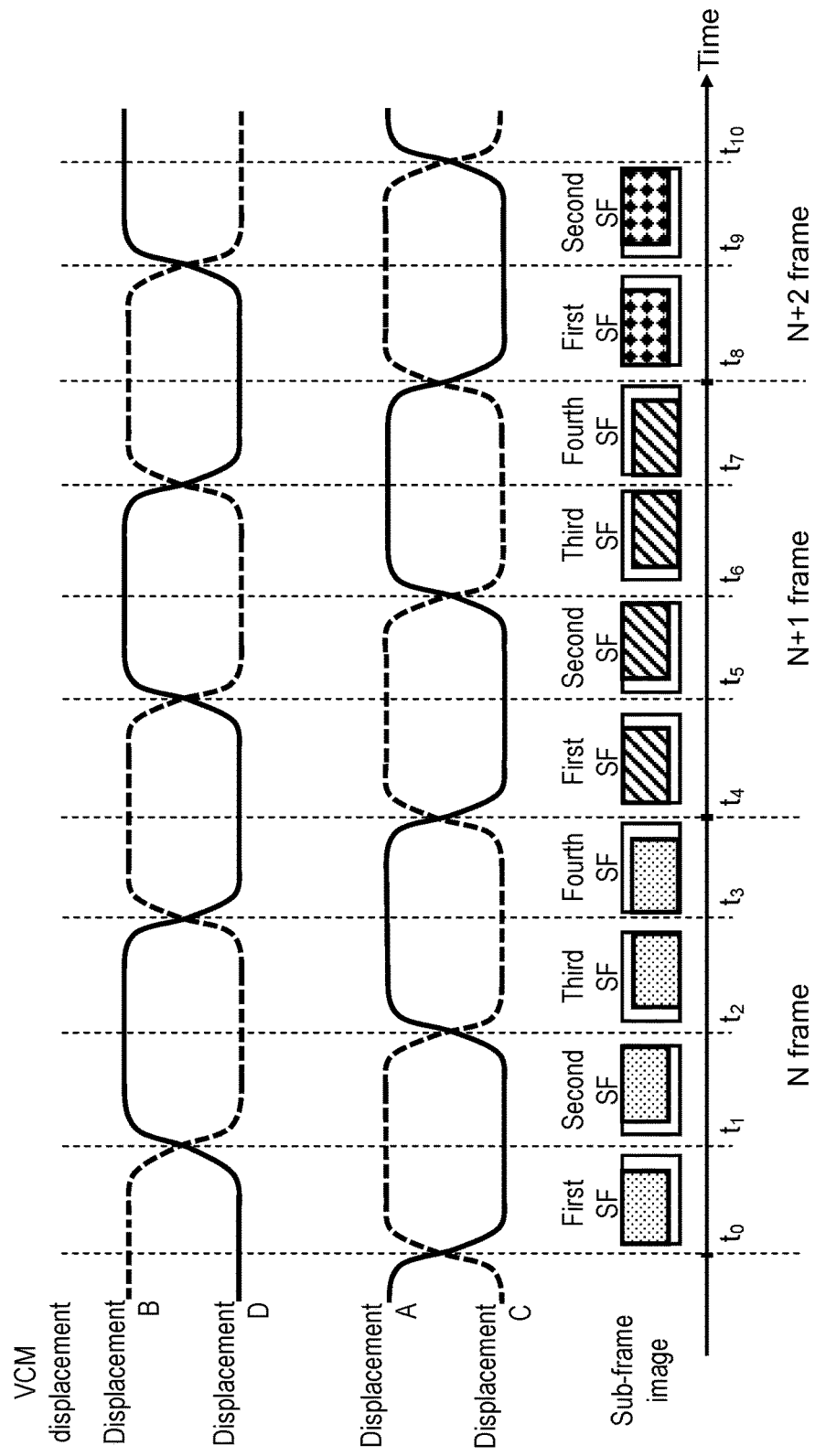
FIG. 13 shows a state where the sub-frame image signal is shifted so as to be a quadruple-density image.

FIG. 13 schematically illustrates a displacement (VCM displacement) to be given to the actuator as an instruction, and a moving manner of a sub-frame image. In this case, as FIG. 13 shows, displacement A is given to actuator A401*a* as an instruction, and displacement C inverted from displacement A is given to actuator C401*c* as an instruction. Displacement B is given to actuator B401*b* as an instruction, and displacement D inverted from displacement B is given to actuator D401*d* as an instruction. The displacement waveforms given as instructions to actuators A401*a* and C401*c* have phases shifted by 90° from those of actuators B401*b* and D401*d*. This mechanism allows parallel-flat glass 400 to rock both on B-D axis and A-C axis working as rotation axes, whereby the optical path of the image light entering parallel-flat glass 400 can be shifted horizontally and vertically. As a result, a first sub-frame (first SF), a second sub-frame (second SF), a third sub-frame (third SF), and a fourth sub-frame (fourth SF) are projected while they are shifted from each other by an amount of a half-pixel.

1-2-3. Operation of a Video Signal Circuit

Figure 14:
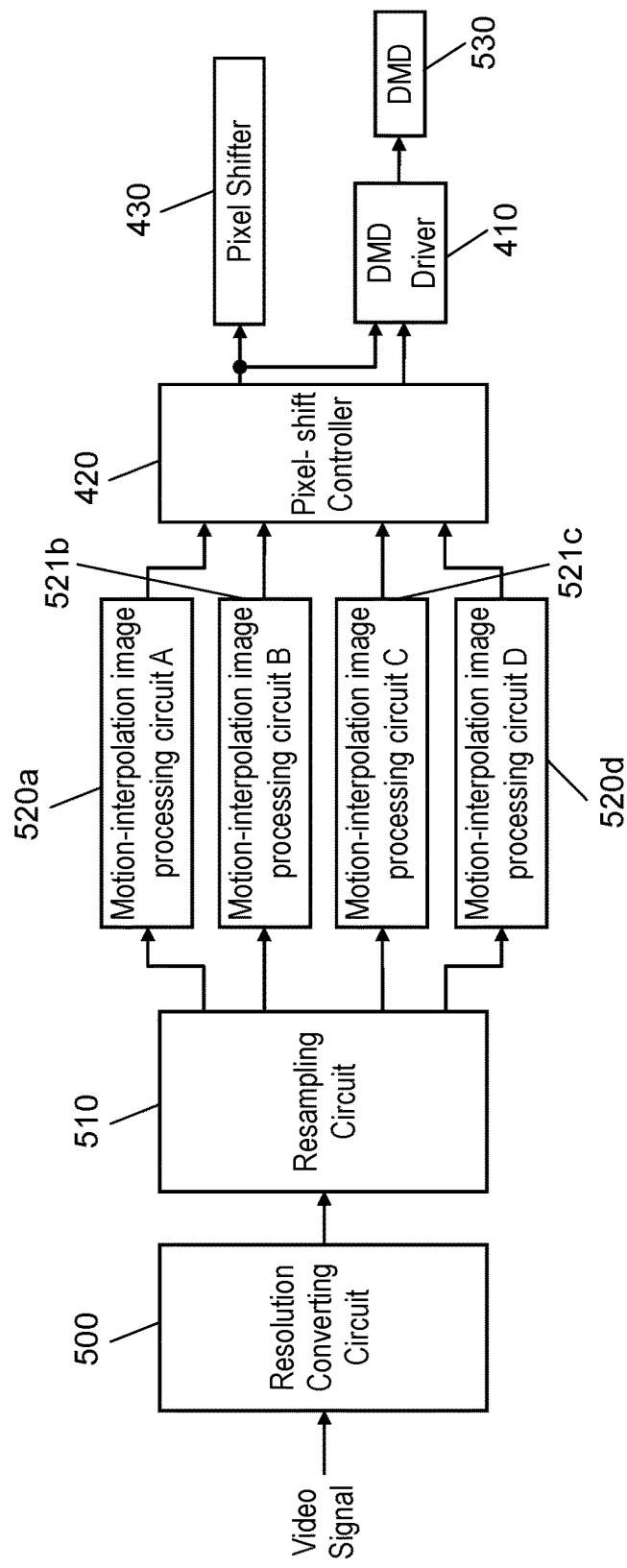
FIG. 14 is a block diagram illustrating a structure of a video signal circuit used in a first exemplary embodiment.

FIG. 14 illustrates a structure of the video signal circuit of projector 100 in accordance with the embodiment, and this structure is used for outputting the quadruple density image.

Resolution converting circuit 500 converts a given resolution (first resolution) of the supplied video signal to the same resolution (second resolution) as that of the base image signal shown in FIG. 9. This resolution of the base image signal is equal to a resolution (projection resolution) of the projected image on the screen.

Resampling circuit 510 resamples the image signal supplied from resolution converting circuit 500 and having a resolution equal to a resolution of the base image signal at sampling positions different from each other as shown in FIG. 12, thereby generating the image signals of the four sheets of sub-frames. These four sub-frame signals have the resolution (the number of pixels) of DMD 530 working as the display element. Each of the sub-frame signals is supplied to motion-interpolation image processing circuits A520*a* to D520*d*.

Figure 15:
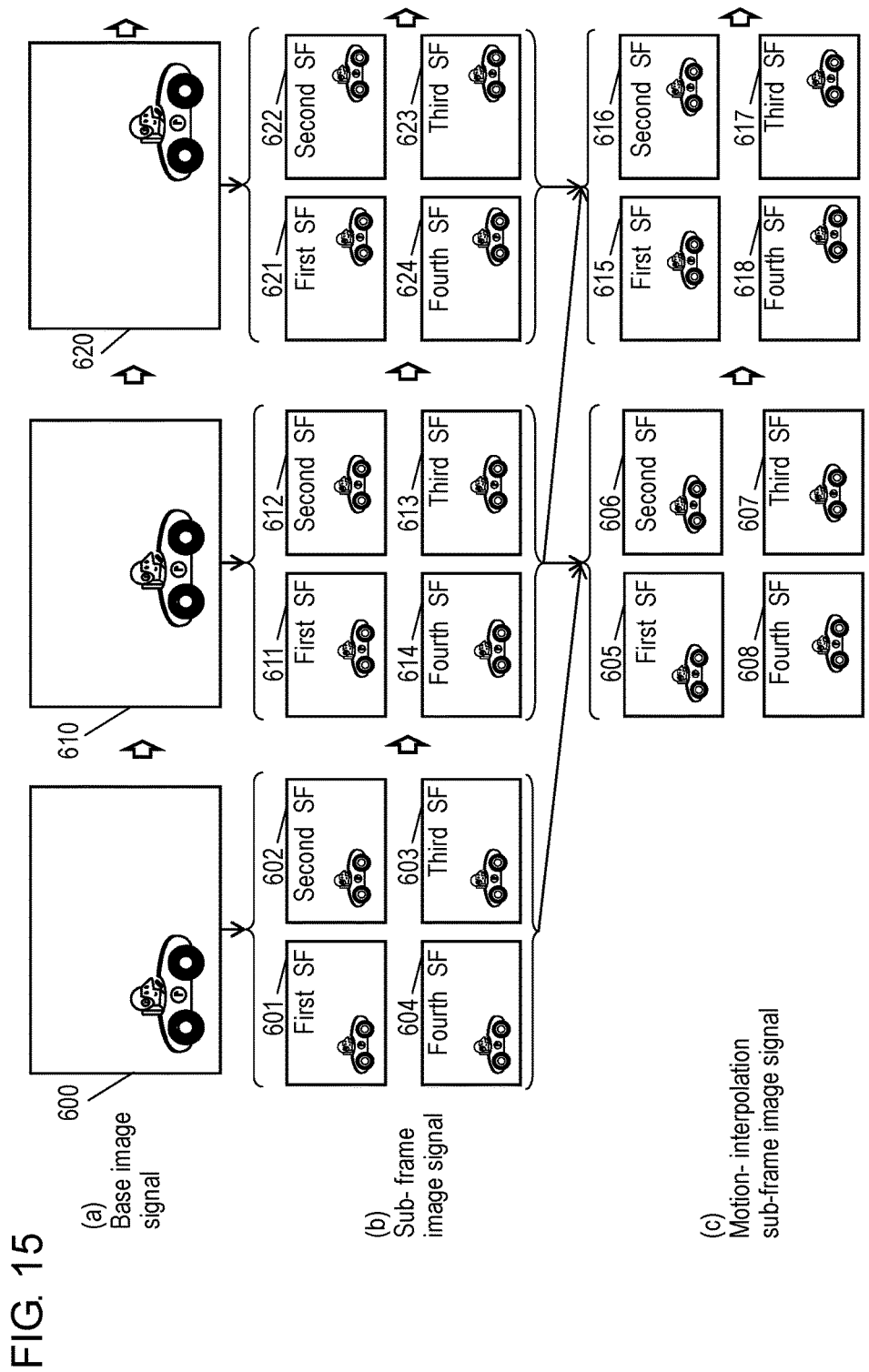
FIG. 15 shows an example of an operation of the motion-interpolation image processing circuit.

FIG. 15 shows an instance of operation of the motion-interpolation image process. FIG. 15(*a*) shows three consecutive base image signals 600, 610, and 620, which are input into resampling circuit 510 in a time series. Then four sub-frame image signals are generated for each of the base image signals. To be more specific, based on the base image signal 600, first sub-frame image signal 601, second sub-frame image signal 602, third sub-frame image signal 603, and fourth sub-frame image signal 604 are generated. In a similar manner, based on the base image signal 610, first sub-frame image signal 611, second sub-frame image signal 612, third sub-frame image signal 613, and fourth sub-frame image signal 614 are generated. Based on the base image signal 620, first sub-frame image signal 621, second sub-frame image signal 622, third sub-frame image signal 623, and fourth sub-frame image signal 624 are generated.

Motion-interpolation image processing circuit A520a receives first sub-frame image signals 601, 611, and 621 shown in FIG. 15(b). Motion-interpolation image processing circuit B520b receives second sub-frame image signals 602, 612, and 622 shown in FIG. 15(b). Motion-interpolation image processing circuit C520c receives third sub-frame image signals 603, 613, and 623 shown in FIG. 15(b). Motion-interpolation image processing circuit D520d receives fourth sub-frame image signals 604, 614, and 624 shown in FIG. 15(b).

Motion-interpolation image processing circuit A520a receives first sub-frame image signals 601, 611, and then outputs these signals remaining intact as motion-interpolation sub-frame image signals 605, 615 shown in FIG. 15(c). The supplied first sub-frame image signals 601 and 611 thus go through motion-interpolation image processing circuit A520a, which however works matching a timing of a signal delayed due to the signal processing in other motion-interpolation image processing circuits.

Motion-interpolation image processing circuit B520b detects motion vectors of second sub-frame image signal 602 through second sub-frame image signal 612 with the aid of two second sub-frame image signals 602 and 612 of two consecutive second sub-frames. Use of the detected vector allows motion-interpolation image processing circuit B520b to generate and output a motion-interpolation sub-frame image signal 606 that is shown in FIG. 15(c) and is ahead of second sub-frame image signal 602 by a time equal to ¼ of the frame rate. To be more specific, in the case of frame rate=60 Hz, motion-interpolation sub-frame image signal 606 becomes an image signal ahead of second sub-frame image signal 602 by 1/240 second.

Motion-interpolation image processing circuit C520c detects motion vectors of third sub-frame image signal 603 through third sub-frame image signal 613 with the aid of third sub-frame image signals 603 and 613 of two consecutive third sub-frames. Use of the detected vector allows motion-interpolation image processing circuit C520c to generate and output a motion-interpolation sub-frame image signal 607 that is shown in FIG. 15(c) and is ahead of third sub-frame image signal 603 by a time equal to ½ of the frame rate. To be more specific, in the case of frame rate=60 Hz, motion-interpolation sub-frame image signal 607 becomes an image signal ahead of third sub-frame image signal 603 by 1/120 second.

Motion-interpolation image processing circuit D520d detects motion vectors of fourth sub-frame image signal 604 through fourth sub-frame image signal 614 with the aid of fourth sub-frame image signals 604 and 614 of two sheets of consecutive fourth sub-frames. Use of the detected vector allows motion-interpolation image processing circuit D520d to generate and output a motion-interpolation sub-frame image signal 608 that is shown in FIG. 15(c) and is ahead of fourth sub-frame image signal 604 by a time equal to ¾ of the frame rate. To be more specific, in the case of frame rate=60 Hz, motion-interpolation sub-frame image signal 608 becomes an image signal ahead of fourth sub-frame image signal 604 by 1/80 second.

In a similar manner, motion-interpolation sub-frame image signals 615, 616, 617, and 618 are generated respectively from first sub-frame image signals 611 and 621, second sub-frame image signals 612 and 622, third sub-frame image signals 613 and 623, and fourth sub-frame image signals 614 and 624. As discussed above, the motion-interpolation sub-frame image signals are sub-frame image signals having undergone the motion-interpolation done by the motion vectors.

As FIG. 14 shows, pixel-shift controller 420 receives image signals of four sheets of motion-interpolation sub-frames supplied from motion-interpolation image processing circuits A520a to D520d, and then supplies these image signals to DMD driver 410. Pixel-shift controller 420 then generates a DMD drive signal so as to output these image signals at a quadruple speed of the input frame rate. Pixel-shift controller 420 supplies a sub-frame image synchronous signal to DMD driver 410 and pixel shifter 430. Drive circuits 404a to 404d of pixel shifter 430 synchronizes with DMD driver 410 for driving actuators A401a to D401d, thereby generating an actuator driving signal so as to move a projection position of a pixel. This mechanism allows DMD 530 to synchronize with actuator 401 and to drive actuator 401 at the quadruple speed of the frame rate, so that image light that has been modulated by the motion-interpolation sub-frame image signal is projected involving the pixel shift.

An output of quadruple density image is described hereinbefore. In the case of the double density image, the video signal circuit is formed of two motion-interpolation image processing circuits. Resampling circuit 510 generates two sub-frame image signals as shown in FIG. 9, and the two sub-frame image signals are supplied to the two motion-interpolation image processing circuits respectively.

1-3. Advantages

The technique disclosed in patent literature 1 needs to generate image signals of three sheets of motion-interpolation sub-frames for each frame with the aid of the motion-interpolation image processing circuit. Since the base image signal supplied to the motion-interpolation image processing circuit has a resolution equal to the projection resolution, a higher resolution of the display element will cause the circuit to become bulky or to encounter difficulty in speedup.

On the other hand, the present embodiment provides the motion-interpolation image processing circuit for each sub-frame, so that it is enough for each of the motion-interpolation image processing circuit to generate only one motion-interpolation sub-frame image signal. Since the resolution of the sub-frame image signal supplied to the motion-interpolation image processing circuit is ¼ as small as that of the projection resolution, the circuit can be formed with ease and the size of the circuit can be smaller.

Second Exemplary Embodiment 2-1. Outline

Figure 16:
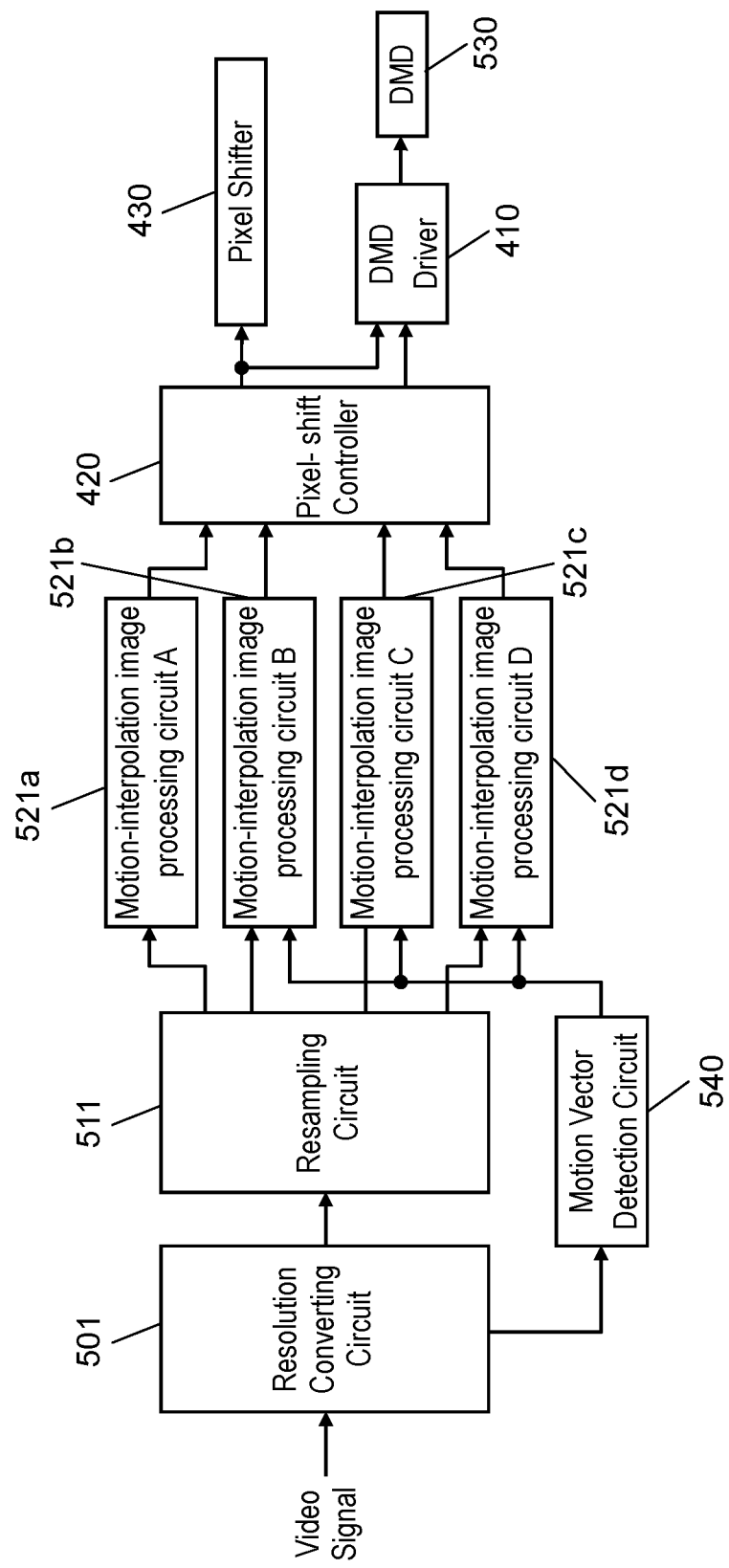
FIG. 16 is a block diagram illustrating a structure of a video signal circuit used in a second exemplary embodiment.

FIG. 16 shows a structure of a video signal circuit of a projector in accordance with this second embodiment. This video signal circuit eliminates a motion-vector detection circuit in motion-interpolation image processing circuits B520b to D520d disposed within the video signal circuit used in the first embodiment, but includes motion-vector detection circuit 540 outside the image signal circuit instead. Motion vector information obtained by motion-vector detection circuit 540 is supplied to motion-interpolation image processing circuit B521b to D521d.

2-2. Operation

FIG. 16 shows the structure of outputting the quadruple density image. The operation of the video signal circuit in accordance with the second embodiment is demonstrated hereinafter with reference to FIG. 16 and FIG. 15.

Resolution converting circuit 501 converts a resolution of a video signal supplied thereto into the same resolution as that of the base image signal shown in FIG. 9, and then outputs the image signal having the same resolution as that of the base image signal to resampling circuit 511 and motion-vector detection circuit 540.

Resampling circuit 511 resamples the image signals, supplied from resolution converting circuit 501 and having the same resolution as that of the base image signal, at sampling positions different from each other, thereby generating sub-frame image signals of four sheets of sub-frames as shown in FIG. 12. To be more specific, similar to the first embodiment, first sub-frame image signals 601, 611, 621, second sub-frame signals 602, 612, 622, third sub-frame image signal 603, 613, 623, and fourth sub-frame image signals 604, 614, 624 are generated based on base image signals 600, 610, and 620 as shown in FIG. 15.

Motion-vector detection circuit 540 detects a motion vector of an image from two consecutive image signals having the same resolution as that of the base image signal supplied from resolution converting circuit 500. The information of the detected motion vector is supplied to motion-interpolation image processing circuits B521b to D521d.

Motion-interpolation image processing circuit A521a receives first sub-frame image signals 601, 611, and 621 generated by resampling circuit 511. Motion-interpolation image processing circuit B521b receives second sub-frame image signals 602, 612, and 622 generated by resampling circuit 511. Motion-interpolation image processing circuit C521c receives third sub-frame image signals 603, 613, and 623 generated by resampling circuit 511. Motion-interpolation image processing circuit D521d receives fourth sub-frame image signals 604, 614 and 624 generated by resampling circuit 511.

Motion-interpolation image processing circuit A521a receives first sub-frame image signals 601, 611, and then outputs these signals remaining intact as motion-interpolation sub-frame image signals 605, 615 shown in FIG. 15(c). The supplied first sub-frame image signals 601 and 611 thus go through motion-interpolation image processing circuit A521a, which however works matching a timing of a signal delayed due to the signal processing in other motion-interpolation image processing circuits.

Using the motion vector supplied from motion-vector detection circuit 540, motion-interpolation image processing circuit B521b generates and outputs a motion-interpolation sub-frame image signal 606 that is shown in FIG. 15(c) and is ahead of second sub-frame image signal 602 by a time equal to ¼ of the frame rate.

Using the motion vector supplied from motion-vector detection circuit 540, motion-interpolation image processing circuit C521c generates and outputs a motion-interpolation sub-frame image signal 607 that is shown in FIG. 15(c) and is ahead of third sub-frame image signal 603 by a time equal to ½ of the frame rate.

Using the motion vector supplied from motion-vector detection circuit 540, motion-interpolation image processing circuit D521d generates and outputs a motion-interpolation sub-frame image signal 608 that is shown in FIG. 15(c) and is ahead of fourth sub-frame image signal 604 by a time equal to ¾ of the frame rate.

In a similar manner, motion-interpolation sub-frame image signals 616, 617, and 618 are generated respectively from second sub-frame image signal 612, third sub-frame image signal 613, and fourth sub-frame image signal 614 with the aid of the motion vector supplied from motion-vector detection circuit 540.

Since the operation of the video signal circuit from now onward is the same as that described in the first embodiment, further descriptions are omitted here.

2-3. Advantage

Since the motion-interpolation image processing circuit in accordance with this second embodiment includes no vector detection circuit, it can downsizes the size thereof comparing with what is discussed in the first embodiment. In the first embodiment, if each of the motion-interpolation image processing circuits exhibits a detection result, from each other, of motion vectors although pixels are close to each other, an image quality is obliged to lower. In this second embodiment; however, the information of the motion vectors is shared with each one of the motion-interpolation image processing circuits, so that the pixels close to each other have the same information of the motion vectors. As a result, the structure of the second embodiment does not permit the image quality to lower.

The foregoing embodiments are discussed for exemplifying the techniques of the present disclosure, so that various changes, replacements, additions, or omissions can be done in the scope of the claims described in the following pages, or in a scope equivalent thereto.

INDUSTRIAL APPLICABILITY

The present disclosure is applicable to projection image display apparatuses such as a projector.

What is claimed is:

1. A projection image display apparatus equipped with a display element that emits image light generated by modulating light from a light source based on a video signal, and a pixel shifter that shifts a pixel of a projected image by changing an optical path of the image light emitted from the display element, the projection image display apparatus comprising:
   a resampling circuit for generating a plurality of sub-frame image signals having a resolution equal to a resolution of the display element, by resampling an image signal having a resolution equal to a resolution of the projected image;
   a motion-interpolation image processing circuit for providing a motion-interpolation image process to the sub-frame image signals in parallel with each other; and
   a pixel-shift controller for receiving sub-frame image signals having undergone the motion-interpolation image process and supplied from the motion-interpolation image processing circuit,
   wherein the pixel-shift controller drives the display element and the pixel shifter at a given timing based on the sub-frame image signals having undergone the motion-interpolation image process, and then displays the projected image, which involves pixel-shift and is emitted from the display element, on a screen.

2. The projection image display apparatus according to claim 1, wherein the motion-interpolation image processing circuit detects a motion vector of the sub-frame image signals, and provides the sub-frame image signals with the motion-interpolation image process by using the motion vector.

3. The projection image display apparatus according to claim 1 further comprising a resolution converting circuit that converts the video signal into the image signal having a resolution equal to a resolution of the projected image.

4. The projection image display apparatus according to claim 3 further comprising a motion-vector detection circuit for detecting a motion vector of the image signal obtained from the resolution converting circuit, wherein the motion-interpolation image processing circuit carries out the motion-interpolation image process based on the motion vector obtained from the motion-vector detection circuit.

* * * * *